United States Patent [19]

Wasserman

[11] Patent Number: 4,924,098

[45] Date of Patent: May 8, 1990

[54] NUCLEAR RADIATION LEVEL DETECTOR

[75] Inventor: Philip D. Wasserman, Cupertino, Calif.

[73] Assignee: Radiation Detectors, Inc., San Mateo, Calif.

[21] Appl. No.: 126,714

[22] Filed: Nov. 30, 1987

[51] Int. Cl.⁵ .............................................. G01T 1/185
[52] U.S. Cl. ..................................... 250/380; 250/374
[58] Field of Search ..................... 250/385.1, 389, 388, 250/387, 386, , 374, 379, 380, 374

[56] References Cited

U.S. PATENT DOCUMENTS

| | | | |
|---|---|---|---|
| 2,509,700 | 5/1950 | Simpson, Jr. | 250/374 |
| 2,917,648 | 12/1959 | Davidson | 250/379 |
| 2,925,509 | 2/1960 | Hayes | 250/379 |
| 4,012,729 | 3/1977 | Weaver et al. | 250/381 |
| 4,041,479 | 8/1977 | Miyabe | 250/381 |
| 4,161,655 | 5/1979 | Cotic et al. | 250/385.1 |
| 4,185,197 | 1/1980 | Byrne | 250/381 |
| 4,205,306 | 5/1980 | Turlej | 250/381 |
| 4,238,788 | 12/1980 | Rosauer et al. | 250/381 |
| 4,471,346 | 9/1984 | Nelson et al. | 250/381 |
| 4,581,536 | 4/1986 | Groppetti et al. | 250/385.1 |
| 4,622,467 | 11/1986 | Britten et al. | 250/389 |
| 4,631,412 | 12/1986 | Turlej | 250/385.1 |
| 4,686,369 | 8/1987 | McDaniel et al. | 250/385.1 |

FOREIGN PATENT DOCUMENTS 1299234 12/1972 United Kingdom ............. 250/385.1

Primary Examiner—Carolyn E. Fields
Attorney, Agent, or Firm—Jack M. Wiseman

[57] ABSTRACT

A nuclear radiation level detector includes an ionization chamber. Within the ionization chamber are spaced electrodes. The space between the electrodes communicates with the atmosphere so as to expose the electrodes to the atmosphere. A voltage source applies a potential across the electrodes. When the atmosphere is not contaminated with nuclear radiation above a reference level, the current flow between the electrodes is nil or substantially so. In the event the atmosphere is contaminated with nuclear radiation above a reference level, a measurable current flows between the electrodes. A measurement and alarm circuit operates an alarm in response to the current flow between the electrodes of a measurable magnitude.

17 Claims, 2 Drawing Sheets

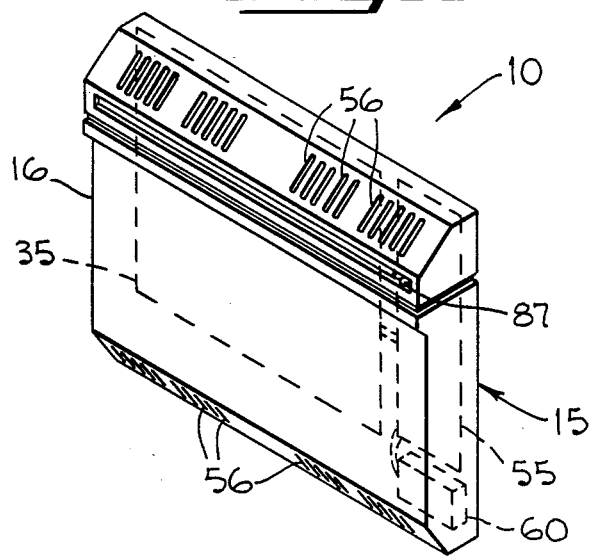
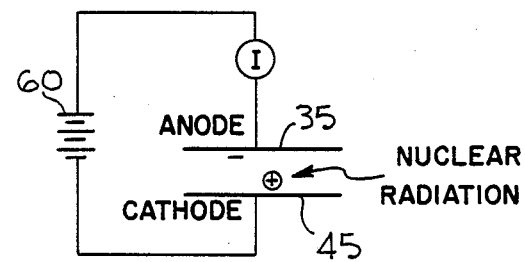
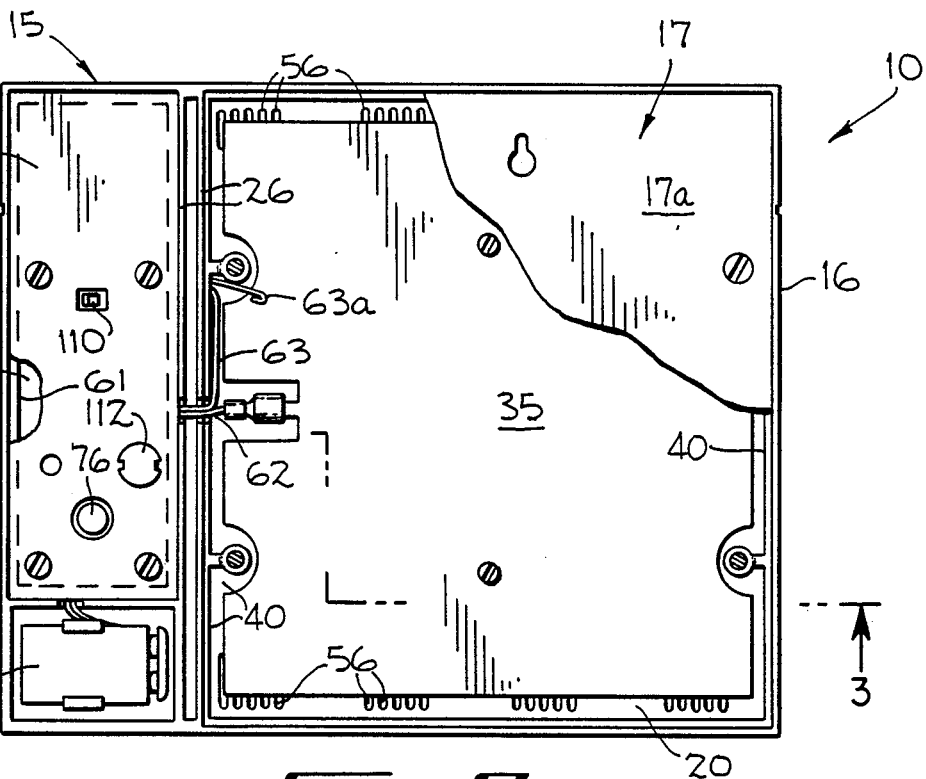
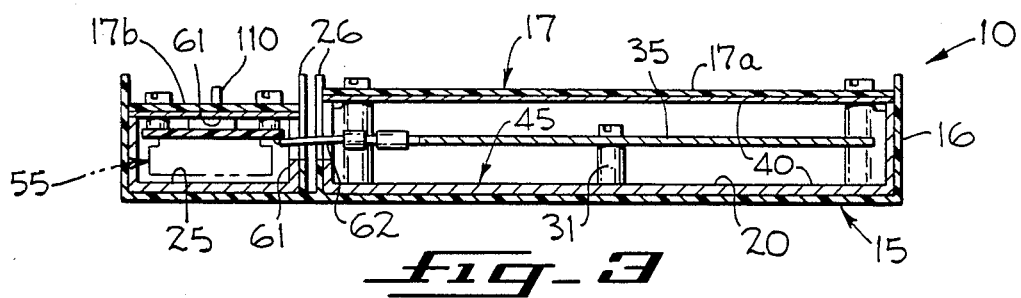

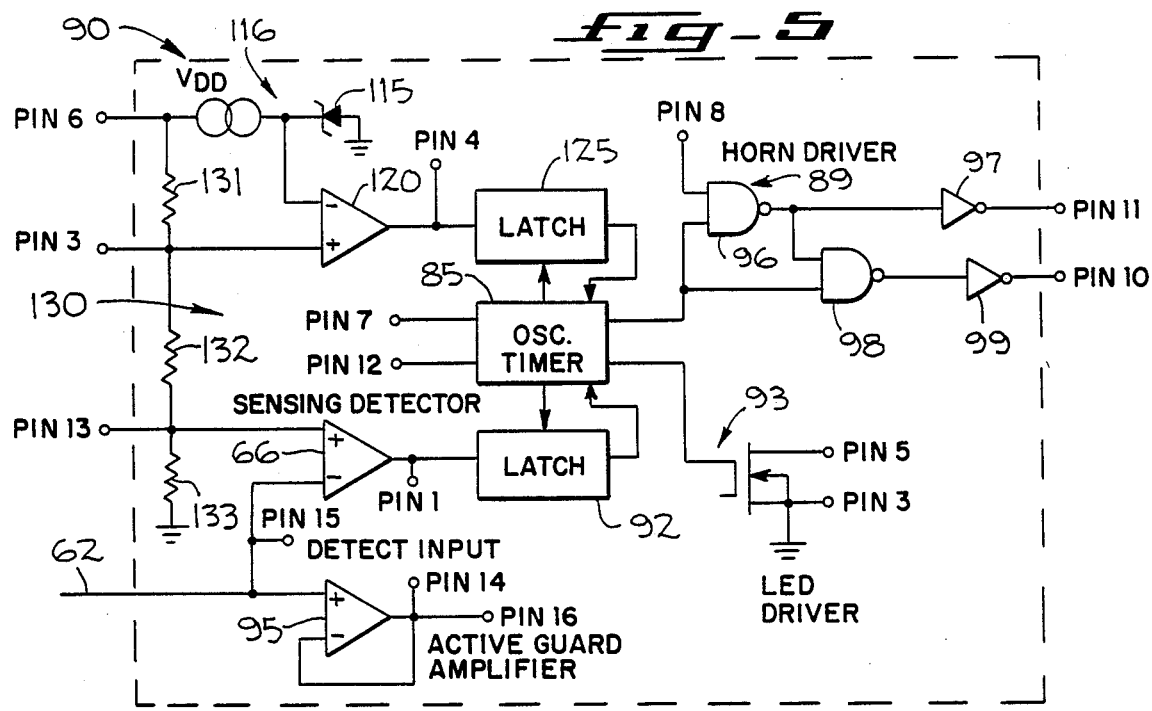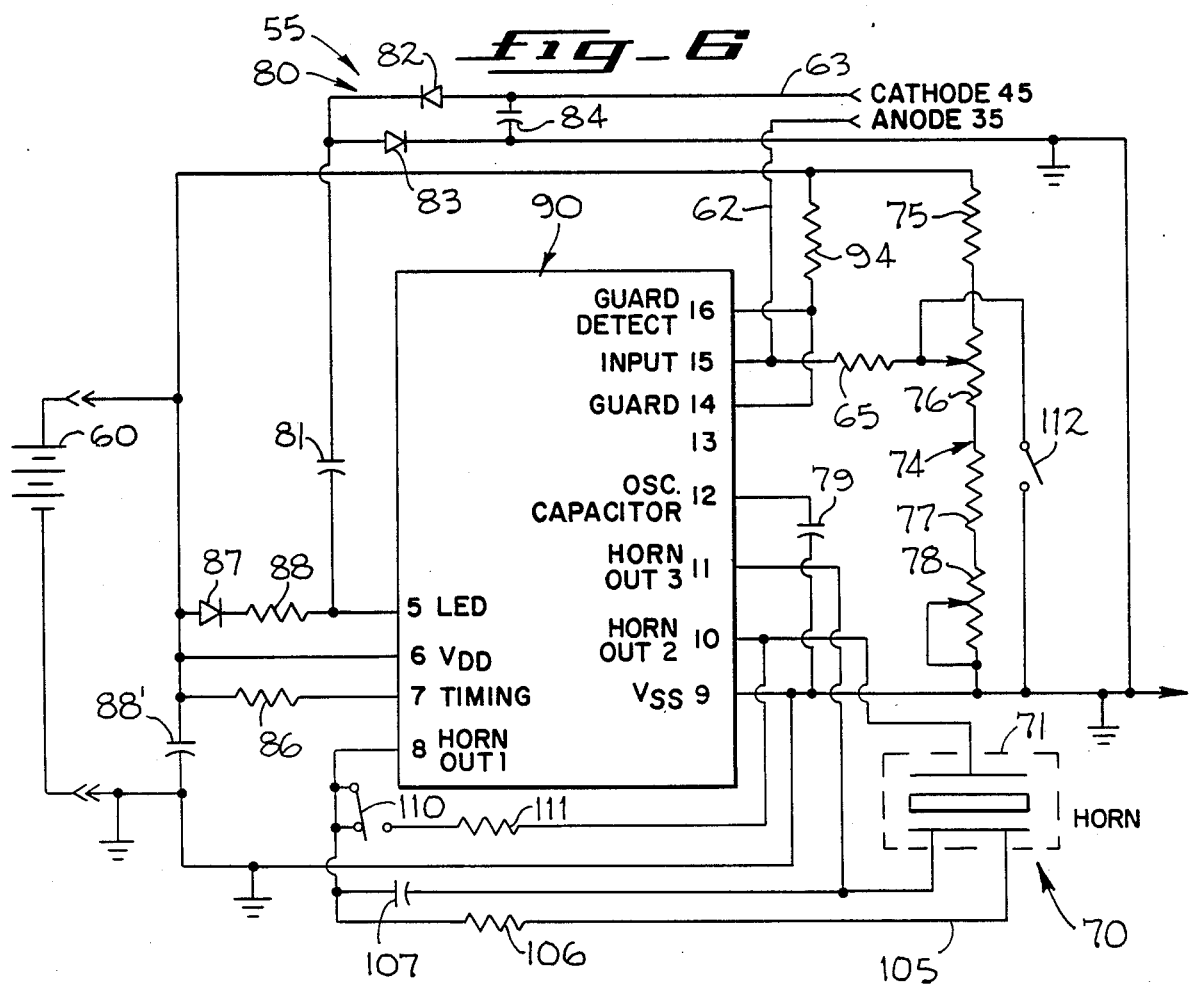

NUCLEAR RADIATION LEVEL DETECTOR

BACKGROUND OF THE INVENTION

The present invention relates in general to nuclear radiation level detectors, and more particularly to a nuclear radiation level detector suitable for use in homes, schools, hospitals, offices, vehicles, and the like.

Heretofore, smoke detectors have been employed to operate an alarm in the event smoke is detected in a home, school, hospital, hotel, or the like. There is a need for a low cost electronic device to detect nuclear radiation levels that can be mounted in a home or the like in a manner similar to the mounting of a smoke detector in a home or the like.

Nuclear power plants or similar facilities have employed apparatus for detecting the level of nuclear radiation. However, such apparatus have been too expensive, complex and cumbersome for homes, hotels, hospitals, schools, and the like.

In the text by Price, Nuclear Radiation Detection published by McGraw Hill (1958), pages 74 and 88, there is disclosed a standard air-wall ionization chamber connected to an electrometer for nuclear radiation detection. As the energy of X-photons or gamma-ray photons increase, the size of the standardization chamber increases. This action was obviated through the use of an actual wall of solid material with the same composition as air. An air-equivalent chamber is produced by using Bakelite, Lucite and other plastics for the solid material. The surface of the plastic is coated with a colloidal carbon to give it the conductive properties for electrodes of ionization chambers.

Motorola Semiconductor Products, Inc. of Austin, Tex., has manufactured and sold an MC14467, an integrated circuit semiconductor device referred to as a low power, complementary metal-oxide semiconductor, medium scale integration, for use in low cost smoke detectors. The MC14467 integrated circuit semiconductor device, when used with an ionization chamber and external components, serves as a smoke detector.

SUMMARY OF THE INVENTION

An object of the present invention is to provide a nuclear radiation level detector that is suitable for use in homes, schools, hotels, hospitals, offices and the like.

Another object of the present invention is to provide a nuclear radiation level detector that is economical to manufacture without sacrificing reliability.

Another object of the present invention is to provide a portable nuclear radiation level detector for enabling a continuous monitoring of the nuclear radiation level whether at a specific location or while in transit.

Briefly described, the nuclear radiation level detector of the present invention comprises an ionization chamber. Included in the ionization chamber are spaced electrodes. The space between the electrodes communicates with the atmosphere so as to expose the electrodes to the atmosphere. A voltage source applies a potential across the electrodes. When the atmosphere is not contaminated with nuclear radiation above a reference level, the current flow between the electrodes is nil or substantially so. In the event the atmosphere is contaminated with nuclear radiation above a reference level, a measurable current flows between the electrodes. A suitable measurement and alarm circuit responds to the current flow to produce an alarm.

A feature of the present invention is that the ionization chamber is inexpensive to manufacture and yet is stable.

Another feature of the present invention is that the cathode electrode of the ionization chamber forms an electrostatic shield for the ionization chamber and the anode electrode of the ionization chamber is well insulated to prevent current losses from within the ionization chamber and to prevent the entry of error currents from external sources into the ionization chamber.

Another feature of the present invention is that the measurement and alarm circuitry is electrostatically shielded to provide accurate meter measurements.

Another feature of the present invention is the employment of a voltage inverting circuit powered by the oscillator timer of the measurement and alarm circuit to increase the sensitivity of the radiation level detector while enabling the radiation level detector to operate from a low voltage battery.

DESCRIPTION OF THE DRAWINGS

FIG. 1 is a perspective view of the nuclear radiation level detector embodying the present invention.

FIG. 2 is a rear view of the nuclear radiation level detector shown in FIG. 1 with a portion of a cover section broken away.

FIG. 3 is a diagrammatic horizontal sectional view of the nuclear radiation level detector shown in FIGS. 1 and 2 taken along line 3—3 of FIG. 2.

FIG. 4 is a diagrammatic illustration of an ionization chamber employed in the nuclear radiation level detector shown in FIGS. 1 and 2.

FIG. 5 is a block diagram of an integrated circuit employed in the nuclear radiation level detector shown in FIGS. 1 and 2.

FIG. 6 is a schematic circuit diagram of the measurement and alarm circuit employed in the nuclear radiation level detector shown in FIGS. 1 and 2.

DESCRIPTION OF THE PREFERRED EMBODIMENT

Illustrated in FIGS. 1–3 is a nuclear radiation level detector 10 embodying the present invention which comprises a plastic housing 15. The plastic housing 15 includes a hollow body 16 and a cover 17. The hollow housing 15 is divided into an ionization chamber 20 and a measurement and alarm chamber 25 by a wall 26. The cover 17 is divided into a section 17a that covers the ionization chamber 20 and a section 17b that covers the measurement and alarm chamber 25. In the exemplary embodiment, the housing 15 is an injection molded plastic housing. The cover sections 17a and 17b are removably secured to the hollow body 16 by suitable self-tapping screws.

Disposed within the ionization chamber 20 is a pedestal insulator 31 (FIG. 3). In the exemplary embodiment, the pedestal insulator 31 is made of plastic and is integrally formed by injection molded plastic during the forming of the hollow body 16 by injection molded plastic. The pedestal insulator 31 is not lined with metallic coating. In this manner, a high quality insulator is attained.

Secured to the distal end of the pedestal insulator 31 is a suitable anode electrode 35 (FIGS. 3 and 4). In the exemplary embodiment, the anode electrode 35 is made of an electrically conductive metal, such as tin plated steel. The anode electrode 35, which serves to collect ions, could be made of any material with a conductive surface.

The inside walls of the ionization chamber 20, except for the pedestal insulator 31, are lined with a metallic conductor 40. In the preferred embodiment, the inner walls of the ionization chamber 20 are lined with a metallic conductor 40 such as aluminum by vacuum metallization. Other suitable means could be employed to line the inner walls of the ionization chamber 20 with the metallic conductor 40, such as conductive painting, metallic lamination, or the like.

The metallic conductors 40 are electrically connected to form a cathode electrode 45 (FIGS. 3 and 4). The conductors 40 are electrically connected to one another by direct contact. The conductor lining on the inner wall of the cover section 17a when in position is in contact with the conductor lining on the housing body 16 of the ionization chamber 20. By virtue of the plastic housing 15 and the shielded inner walls of the plastic housing 15 through the metallic conductors 40, the anode electrode 35 is electrostatically shielded for accurate measurement of the nuclear radiation of the atmosphere. In this manner, the anode electrode 35 is well insulated to minimize loss of current generated from the nuclear radiation of the atmosphere and also to inhibit the entry of stray or error currents into the ionization chamber 20 from other or extraneous sources.

Since the cathode electrode 45 is connected to a source of low d.c. voltage 60 (FIGS. 2 and 4), there is a low alternating current impedance relative to ground potential, maintained by a capacitor 84 (FIG. 6). Thus, the cathode electrode 45 serves as an electrostatic shield to reduce currents produced by interfering electrical fields from reaching the anode electrode 35. Any such currents produced by these fields will be intercepted by the cathode electrode 45 and by-passed to ground. The measurement of low currents lends itself to a high impedance, low level measuring circuit, such as a measurement and alarm circuit 55 (FIGS. 3 and 6). The measurement and alarm circuit 55 is secured by screws to standoffs on the cover section 17b.

The anode electrode 35 and the cathode electrode 45 are separated by an air space (FIGS. 3 and 4). The atmosphere enters the air space between the anode electrode 35 and the cathode electrode 45 through suitable openings 56 formed in the hollow body 16. Hence, the electrodes 35 and 45 are exposed to the atmosphere. The voltage source 60 (FIGS. 3 and 4) applies a potential across the electrodes 35 and 45. The measurement and alarm circuit 55 measures the current flow between the cathode electrode 45 and the anode electrode 35. When the ionizing nuclear radiation between the cathode electrode 45 and the anode electrode 35 is substantially nil, there is no current flow between the cathode electrode 45 and the anode electrode 35. When the ionizing alpha, beta or gamma nuclear radiation between the cathode electrode 45 and the anode electrode 35 is present at a detectable level, the air molecules between the cathode electrode 45 and the anode electrode 35 are ionized to produce a net electrical charge. The ionized air molecules are attracted to an oppositely charged electrode and, hence, produce a measurable current flow between the cathode electrode 45 and the anode electrode 35 that is measured by the measurement and alarm circuit 55.

The chamber 25 for the measurement and alarm circuit 55 is electrostatically shielded, since the measurement and alarm circuit 55 operates at a high impedance. In this manner, unwanted interference is excluded from the chamber 25 by the electrostatic shield and, hence, the measurement and alarm circuit 55 is shielded from outside interference. Toward this end, the inside walls of the chamber 25 are lined with a metallic conductor 61 (FIG. 3). In the preferred embodiment, the inner walls of the chamber 25 are lined with the metallic conductor 61, such as aluminum, by vacuum metallization. Other suitable means could be employed to line the inner walls of the chamber 25 with the metallic conductor 61, such as conductive painting, metallic lamination, or the like.

The anode electrode 35 is connected to the measurement and alarm circuit 55 over a conductor 62 (FIGS. 3, 5 and 6). The cathode electrode 45 is at a negative potential relative to circuit ground and is connected to an inverting circuit 80 (FIG. 6) of the measurement and alarm circuit 55 via a conductor 63 (FIGS. 2 and 6). The conductor lining 61 on the inner wall of the cover section 17b, when in position, contacts the conductor lining 61 on the housing body 16 of the measurement and alarm chamber 25. A suitable spring 63a maintains the conductor 63 in constant engagement with the lining 40 of the ionization chamber 20. The measurement and alarm circuit 55 is mounted on the cover section 17b by suitable self-tapping screws.

The current from the anode electrode 35 is applied through a current sensing resistor 65 (FIG. 6) to the measurement and alarm circuit 55. The current sensing resistor 65 is connected in series with a voltage produced by voltage divider 74 (FIG. 6). By adjusting the voltage resulting from the sensing resistor 65 and the source of voltage 60, the amount of current and, hence, the nuclear radiation required to trigger a detector circuit 66 of the measurement and alarm circuit 55 can be regulated.

More specifically, the current flow from the anode electrode 35 produces a voltage across the current sensing resistor 65. The voltage across the current sensing resistor 65 reduces the resultant voltage between the input of the detector 66 (FIG. 4) and ground. The voltage divider 74 (FIG. 6) produces a voltage in series with the current sensing resistor 65 and ground. The resulting voltage, when the radiation level is above a reference level, activates the measurement circuit 55 causing a suitable alarm 70 to be activated. In the preferred embodiment, the alarm 70 is a piezo-electric horn 71 to produce an audible sound and a light emitting diode 87 to produce a light. The horn 71 (FIG. 6) is of the type manufactured by Murata Erie of Japan as Model No. 75B-34R7-3C2. The light produced by the light emitting diode 87 (FIG. 6) is an interrupted light in a periodic on and off mode.

The sensitivity of the radiation level detector 10 is regulated by a divider network 74 (FIG. 6) comprising resistor 75, variable resistor 76, resistor 77 and variable resistor 78. The divider network 74 serves to bias the current sensing resistor 65 so that the adjustment of the variable resistor 76 at the low resistance end reduces the bias and is adequate to trigger the measurement circuit 55 at the present radiation level of the atmosphere. Moving the variable resistor 76 to the high resistance end will increase the bias and will raise the voltage level required to trigger the measurement circuit 55. Hence, the lowest resistance position of the variable resistor 76 which triggers the measurement circuit 55 is a measurement of the radiation level at a normal radiation level atmosphere condition. Variable resistor 78 serves to calibrate the unit so that the measurement and alarm circuit 55 triggers at the desired radiation level with the variable resistor 76 at the low resistance end. A capacitor 79 serves to determine the frequency at which the radiation level is sensed.

Generally, the radiation level detector 10 is mounted on the wall of a residence or the like with the variable resistor 76 set to the lowest resistance or the highest sensitivity position. While the alarm 71 is activated, the operator adjusts the variable resistor 76 to the lowest resistance, or the highest sensitivity position. The radiation level detector 10 is adjusted through the resistor 78 to activate the alarms at the desired level of radiation.

The sensitivity of the ionization chamber 20 to the nuclear radiation level of the atmosphere is a function of the voltage from anode electrode 35 to cathode electrode 45. In the exemplary embodiment, the operating anode voltage is one-half the potential of the battery 60. In the exemplary embodiment, the battery voltage is 9 volts and the anode voltage is 4.5 volts. Operating the anode 35 at one-half the voltage of the battery 60 reduces the sensitivity of the radiation level detector 10 by approximately a factor of 10 below its maximum value. For this reason, the voltage inverter circuit 80 (FIG. 6) produces, in the exemplary embodiment, approximately −8 volts to bias the cathode electrode 45 of the ionization chamber 20. As a consequence thereof, the potential difference between the anode electrode 35 and the cathode electrode 45, in the exemplary embodiment, is 13 volts. The sensitivity of the radiation level detector 10 is thereby increased in excess of 70% of its maximum value.

The voltage inverter circuit 80 comprises capacitor 81, rectifier 82, rectifier 83 and the capacitor 84. The voltage inverter circuit 80 employs periodic pulses emitted by an oscillator timer circuit 85 (FIG. 5) as a power source. The operation is similar to that commonly employed in a voltage doubler circuit. In the exemplary embodiment, the periodic pulses are applied to the voltage inverter circuit 80 every 40 seconds. A resistor 86 controls the frequency of the oscillator timer 85. Once every 40 seconds a negative pulse of approximately 10 milliseconds duration is applied through the capacitor 81 to the diode 82, which conducts, thereby charging the capacitor 84 to a negative potential. When the pulse goes positive, the diode 82 conducts, effectively "clamping" the junction of the diodes 82 and 83 to approximately +0.6 volts, in preparation for the next negative pulse. The light emitting diode 87 in series with a resistor 88 interconnects the source of voltage 60 with the measurement and alarm circuit 55. When there is no radiation, this diode flashes once every 40 seconds. A capacitor 88' is connected in parallel with the 9 volt battery 60 to reduce the AC impedance of the voltage source. The resistor 88 sets the LED current.

Motorola Semiconductor Products Inc. of Austin, Tex., manufactures and sells an integrated circuit semiconductor device 90 (FIGS. 5 and 6), known as the MC14467. In the exemplary embodiment, the present invention employs the MC14467 integrated circuit semiconductor device. The MC14467 integrated circuit semiconductor device 90 is a low power complementary metal-oxide semiconductor, medium scale integration.

The integrated circuit semiconductor device 90, in the exemplary embodiment, includes the oscillator timer 85 which operates with a period of 16.7 seconds during normal operating conditions. During each 16.7 seconds, internal power is applied to the integrated circuit semiconductor device 90. When power is applied to the integrated circuit semiconductor device 90, a test is made of the nuclear radiation level of the atmosphere to which the anode electrode 35 and the cathode electrode 45 are exposed. An oscillator capacitor 91 of a low leakage type is employed, since very small currents are used in the oscillator timer 85.

When a radiation level detected by the anode electrode 35 and the cathode electrode 45 exceeds the reference trigger level, the sensing detector 66 of the integrated circuit semiconductor device 90 is activated to trigger a latch circuit 92 of the integrated circuit semiconductor device 90. The triggering of the latch circuit 92 causes the oscillator timer 85 to generate oscillating pulses, in the exemplary embodiment, every 40 milliseconds.

Connected to the output of the oscillator timer 85 is the horn driver circuit 89 of the integrated circuit semiconductor device 90 and a light emitting diode driver circuit 93 of the integrated circuit semiconductor device 90. The horn driver circuit 89 is triggered by the oscillator timer 85, when the nuclear radiation level detected by the anode electrode 35 and the cathode electrode 45 exceeds the nuclear radiation reference level to operate the piezoelectric horn 71. In a similar manner, the light emitting diode driver circuit 93, in response to the operation of the oscillator timer 85, operates the light emitting diode 87 (FIG. 6), when the nuclear radiation level detected in the ionization chamber 20 by the anode electrode 35 and the cathode electrode 45 exceeds the reference level of nuclear radiation. When the nuclear radiation level in the ionization chamber 25 exceeds the reference level of nuclear radiation, the light emitting diode 87 (FIG. 6) pulses on and off, in the exemplary embodiment, at a rate of once per second. The piezoelectric horn 71, in the exemplary embodiment, modulates 200 milliseconds on and 40 milliseconds off.

An active guard amplifier 95 of the integrated circuit semiconductor device 90 is connected to the sensing detector 66 and the terminals of the integrated circuit semiconductor device 90 adjacent the input terminal of the sensing detector 66. In the exemplary embodiment, the terminals of the integrated circuit semiconductor device 90 for the active guard operating amplifier 95 and the sensing detector 66 are within 100 millivolts of the input signal. This arrangement keeps surface leakage of currents to a minimum and provides a method of measuring the input voltage without loading the ionization chamber 20. In the preferred embodiment, the input terminal of the sensing detector 66 has internal diode protection against static damage. A resistor 94 interconnects the active guard amplifier 95 with the source of voltage 60 to set the output current of the operating amplifier 95.

The horn driver circuit 89 comprises a NAND gate 96. In series with the NAND gate 96 is a power amplifier 97. The output of the power amplifier 97 is connected to one input of the horn 71. A NAND gate 98 is connected to the output of the NAND gate 96 and a power amplifier 99 is connected to the output of the NAND gate 98. The output of the power amplifier 99 is connected to another input of the horn 71. As shown in FIG. 6, the horn 71 includes a feedback circuit 105, which includes a resistor 106 and a capacitor 107. The resistor 106 and the capacitor 107 are connected to the integrated circuit semiconductor device 90 for producing audible tones when the measurement and alarm circuit 55 is in the radiation alarm mode.

Should the source of voltage 60 drop below a safe operating level to indicate a need for replacement, short audible tones are produced by the horn 71. Toward this end, the feedback circuit 105, which includes the resistor 106 and the capacitor 107, is connected to the horn terminals of the integrated circuit semiconductor device 90.

Should it be desired that the operation of the horn 71 be reduced to clicks instead of loud audible sounds, a switch 110 is connected to the horn terminals of the integrated circuit semiconductor device 90 through a resistor 111. When the switch 110 is actuated to produce the click sound, the light emitting diode 72 is operable to flash at one second intervals when the nuclear radiation level in the ionization chamber 20 is above the adjusted reference level.

A test of the operation of the horn 71 and the light emitting diode 87 is made through a switch 112. The switch 112 is connected to the adjustable element of the variable resistor 76. When the switch 112 is closed, the adjustable element of the variable resistor 76 is momentarily connected to ground to cause the operation of the horn 71 and the light emitting diode 87.

In the exemplary embodiment, the oscillator timer 85 of the integrated circuit semiconductor device 90 operates with a period of 16.7 seconds during normal operating conditions. During each 16.7 seconds, the internal power is applied to the integrated circuit semiconductor device 90. When power is applied to the integrated circuit semiconductor device 90, a test is made of the nuclear radiation level of the atmosphere to which the anode electrode 35 and the cathode electrode 45 are exposed. In the exemplary embodiment, every 24 clock cycles a check is made for low battery condition by comparing the voltage VDD and the voltage across a Zener diode 115 (FIG. 5) by means of a low battery comparator circuit 116 of the integrated circuit semiconductor device 90. The varying and self-adjusting voltage across the Zener diode 115 and the voltage VDD oppose one another in an offset or subtracting manner.

Should the voltage VDD fall below a reference voltage or trip point, a suitable detector 120 of the integrated circuit semiconductor device 90 is activated. The activation of the comparator detector 120 triggers a suitable latch circuit 125 of the integrated circuit semiconductor device 90. The triggering of the latch circuit 125 causes the oscillator timer 85 to generate oscillating pulses, in the exemplary embodiment, every 40 milliseconds. The oscillating frequency of the oscillator timer 85, when latched by the latch circuit 125, operates the horn 71 to produce short audible tones and operates the light emitting diode 87 in a periodic on and off mode of short durations to indicate that the voltage output across the battery 60 is below the safe reference voltage or trip point. The low battery comparator information is only latched during the pulse time of the light emitting diode 87. When the radiation level detector 10 is operating in a radiation alarm mode, the low voltage comparator circuit 116 is inhibited from operating by the output of the oscillator timer 85 applied to the latch circuit 125.

The alarm sensitivity threshold of the sensing detector 66 and the low battery threshold of the comparator within the integrated circuit semiconductor device 90, are set by a voltage divider network 130 of the integrated circuit semiconductor device 90 (FIG. 5). The voltage divider network 130 includes resistors 131, 132 and 133.

In the exemplary embodiment, the following circuit elements have the following values:
Battery 60: 9 volts
Resistor 65: $2.5 \times 10^{11}$ ohms
Resistor 75: 220K ohms
Resistor 76: 2 megohms
Resistor 77: 1 megohms
Resistor 78: 2 megohms
Capacitor 79: 0.1 micofarads
Capacitor 81: 0.1 microfarads
Capacitor 84: 0.5 microfarads
Resistor 86: 8.2 megohms
Resistor 88: 1K ohms
Capacitor 88: 100 microfarads
Resistor 94: 1 megohms
Resistor 106: 220K ohms
Capacitor 107: 0.001 microfarads
Resistor 111: 1.5 megohms
Resistor 131: 80K ohms
Resistor 132: 1045K ohms
Resistor 133: 1125K ohms

What is claimed is:

1. A nuclear radiation level detector for detecting the nuclear radiation level in an atmosphere comprising:
   (a) an ionization chamber communicating with the atmosphere, said ionization chamber being formed with a plurality of walls having internal surfaces facing the interior of said ionization chamber;
   (b) a plurality of electrodes disposed in said ionization chamber and exposed to the nuclear radiation of the atmosphere communicating with said ionization chamber;
   (c) a source of voltage interconnecting said electrodes, said electrodes conducting current in response to the magnitude of the nuclear radiation level of the atmosphere communicating with said ionization chamber, the magnitude of the current flow from said electrodes is commensurate with the magnitude of the nuclear radiation level of the atmosphere communicating with said ionization chamber;
   (d) one of said electrodes being formed from a conductor lining an internal surface of at least one of said walls of said ionization chamber, said conductor providing an electrostatic shield for said ionization chamber; and
   (e) a circuit connected to said electrodes for producing an alarm in response to the nuclear radiation level of the atmosphere exceeding a reference level.

2. A nuclear radiation level detector as claimed in claim 1 wherein another of said electrodes is insulated from and spaced from said one electrode.

3. A nuclear radiation level detector as claimed in claim 1 and comprising a housing made of plastic material in which is disposed said ionization chamber.

4. A nuclear radiation level detector as claimed in claim 3 wherein said housing comprises a measurement and alarm chamber separated from said ionization chamber in which said circuit is disposed.

5. A nuclear radiation level detector as claimed in claim 1 wherein said one electrode is a cathode and another of said electrodes is an anode.

6. A nuclear radiation level detector for detecting the nuclear radiation level in an atmosphere comprising:

(a) an ionization chamber communicating with the atmosphere, said ionization chamber being formed with a plurality of walls having internal surfaces facing the interior of said ionization chamber;

(b) a plurality of electrodes disposed in said ionization chamber and exposed to the nuclear radiation of the atmosphere communicating with said ionization chamber;

(c) a source of voltage interconnecting said electrodes, said electrodes conducting current in response to the magnitude of the nuclear radiation level of the atmosphere communicating with said ionization chamber, the magnitude of the current flow from said electrodes is commensurate with the magnitude of the nuclear radiation level of the atmosphere communicating with said ionization chamber;

(d) one of said electrodes being formed from a conductor lining an internal surface of at least one of said walls of said ionization chamber, said conductor providing an electrostatic shield for said ionization chamber; and (e) a circuit connected to said electrodes for producing an alarm in response to the nuclear radiation level of the atmosphere exceeding a reference level, (f) the internal surfaces of all of said walls are substantially lined with conductors for providing an electrostatic shield for said ionization chamber.

7. A nuclear radiation level detector as claimed in claim 6 and comprising an insulating pedestal disposed in said ionization chamber and wherein another of said electrodes is seated on said pedestal in spaced relation to said one electrode.

8. A nuclear radiation level detector as claimed in claim 7 and comprising a housing made of plastic material in which is disposed said ionization chamber.

9. A nuclear radiation level detector as claimed in claim 8 wherein said housing comprises a measurement and alarm chamber separated from said ionization chamber in which said circuit is disposed.

10. A nuclear radiation level detector as claimed in claim 9 wherein said measurement and alarm chamber has a plurality of walls, and said walls of said measurement and alarm chamber are lined with conductive material to electrostatically shield said measurement and alarm chamber.

11. A nuclear radiation level as claimed in claim 10 wherein said housing includes a cover for said ionization chamber and a separate cover for said measurement and alarm chamber.

12. A nuclear radiation level detector as claimed in claim 11 wherein said housing includes a plastic divider separating said ionization chamber from said measurement and alarm chamber.

13. A nuclear radiation level detector as claimed in claim 7 wherein said one electrode is a cathode and said another of said electrodes is an anode.

14. A nuclear radiation level detector for detecting the nuclear radiation level in an atmosphere comprising:

(a) an ionization chamber communicating with the atmosphere, said ionization chamber being formed with a plurality of walls having internal surfaces facing the interior of said ionization chamber;

(b) a plurality of electrodes disposed in said ionization chamber and exposed to the nuclear radiation of the atmosphere communicating with said ionization chamber;

(c) a source of voltage interconnecting said electrodes, said electrodes conducting current in response to the magnitude of the nuclear radiation level of the atmosphere communicating with said ionization chamber, the magnitude of the current flow from said electrodes is commensurate with the magnitude of the nuclear radiation level of the atmosphere communicating with said ionization chamber;

(d) one of said electrodes being formed from a conductor lining an internal surface of at least one of said walls of said ionization chamber, said conductor providing an electrostatic shield for said ionization chamber;

(e) a circuit connected to said electrodes for producing an alarm in response to the nuclear radiation level of the atmosphere exceeding a reference level; and (f) a housing made of plastic material in which is disposed said ionization chamber, said housing comprising a measurement and alarm chamber separated from said ionization chamber in which said circuit is disposed, said measurement and alarm chamber having a plurality of walls, and said walls of said measurement and alarm chamber being lined with conductive material to electrostatically shield said measurement and alarm chamber.

15. A nuclear radiation level detector for detecting the nuclear radiation level in an atmosphere comprising:

(a) an ionization chamber communicating with the atmosphere, said ionization chamber being formed with a wall;

(b) a plurality of electrodes disposed in said ionization chamber and exposed to the nuclear radiation of the atmosphere communicating with said ionization chamber;

(c) a source of voltage interconnecting said electrodes, said electrodes conducting current in response to the magnitude of the nuclear radiation level of the atmosphere communicating with said ionization chamber, the magnitude of the current flow from said electrodes is commensurate with the magnitude of the nuclear radiation level of the atmosphere communicating with said ionization chamber;

(d) one of said electrodes being formed from a conductor lining the wall of said ionization chamber, said conductor providing an electrostatic shield for said ionization chamber, another of said electrodes being insulated from and spaced from said one electrode;

(e) a circuit connected to said electrodes for producing an alarm in response to the nuclear radiation level of the atmosphere exceeding a reference level; and (f) a voltage inverter circuit connected to said one electrode for increasing the potential difference between said electrodes for increasing the sensitivity of said detector to variations in levels of nuclear radiation.

16. A nuclear radiation level detector for detecting the nuclear radiation level in an atmosphere comprising:

(a) an ionization chamber communicating with the atmosphere, said ionization chamber being formed with a wall;

(b) a plurality of electrodes disposed in said ionization chamber and exposed to the nuclear radiation of the atmosphere communicating with said ionization chamber;

(c) a source of voltage interconnecting said electrodes, said electrodes conducting current in response to the magnitude of the nuclear radiation level of the atmosphere communicating with said ionization chamber, the magnitude of the current flow from said electrodes is commensurate with the magnitude of the nuclear radiation level of the atmosphere communicating with said ionization chamber;

(d) one of said electrodes being formed from a conductor lining the wall of said ionization chamber, said conductor providing an electrostatic shield for said ionization chamber, another of said electrodes being insulated from and spaced from said one electrode;

(e) a circuit connected to said electrodes for producing an alarm in response to the nuclear radiation level of the atmosphere exceeding a reference level; and (f) a divider network connected to said another of said electrodes for regulating the sensitivity of said detector to variations in levels of nuclear radiation.

17. A nuclear radiation level detector for detecting the nuclear radiation level in an atmosphere comprising:

(a) an ionization chamber communicating with the atmosphere, said ionization chamber being formed with a wall;

(b) a plurality of electrodes disposed in said ionization chamber and exposed to the nuclear radiation of the atmosphere communicating with said ionization chamber;

(c) a source of voltage interconnecting said electrodes, said electrodes conducting current in response to the magnitude of the nuclear radiation level of the atmosphere communicating with said ionization chamber, the magnitude of the current flow from said electrodes is commensurate with the magnitude of the nuclear radiation level of the atmosphere communicating with said ionization chamber;

(d) one of said electrodes being formed from a conductor lining the wall of said ionization chamber, said conductor providing an electrostatic shield for said ionization chamber, another of said electrodes being insulated for and spaced from said one electrode;

(e) a circuit connected to said electrodes for producing an alarm in response to the nuclear radiation level of the atmosphere exceeding a reference level;

(f) said ionization chamber having a plurality of walls and all of said walls are substantially lined with conductors for providing an electrostatic shield for said ionization chamber;

(g) an insulating pedestal disposed in said ionization chamber and wherein said another of said electrodes being seated on said pedestal in spaced relation to said one electrode; and (h) a divider network connected to said another of said electrodes for regulating the sensitivity of said detector to variations in level of nuclear radiation.

* * * * *